United States Patent [19]

Miller

[11] Patent Number: 4,497,045
[45] Date of Patent: Jan. 29, 1985

[54] SEISMIC SYSTEM WITH SIGNAL MULTIPLEXERS

[75] Inventor: Sheldon M. Miller, Tulsa, Okla.

[73] Assignee: Tesco Engineering Company, Tulsa, Okla.

[21] Appl. No.: 255,378

[22] Filed: Apr. 20, 1981

[51] Int. Cl.³ ............................................... G01V 1/22
[52] U.S. Cl. ...................................... 367/78; 181/112;
367/20; 367/79; 367/80; 370/77
[58] Field of Search ................. 367/20, 56, 58, 78–80,
367/177; 181/112; 340/870.15, 857, 858,
870.12–870.14; 370/69, 77, 88, 112

[56] References Cited

U.S. PATENT DOCUMENTS

| 3,777,308 | 12/1973 | Borkovsky et al. | 367/79 |
| 3,866,162 | 2/1975 | Florian | 367/177 |
| 3,923,121 | 12/1975 | Kruppenbach et al. | 181/112 |
| 3,988,712 | 10/1976 | Ezell et al. | 367/80 |
| 4,041,445 | 8/1977 | Carter | 367/79 |
| 4,072,923 | 2/1978 | Siems et al. | 370/112 |
| 4,092,629 | 5/1978 | Siems et al. | 367/79 |
| 4,146,750 | 3/1979 | Spiesman | 370/112 |
| 4,283,778 | 8/1981 | Meyer et al. | 367/58 |
| 4,313,193 | 1/1982 | Nakano et al. | 370/112 |
| 4,319,347 | 3/1982 | Savit | 367/79 |

Primary Examiner—Maynard R. Wilbur
Assistant Examiner—K. R. Kaiser

[57] ABSTRACT

A cable system for carrying out seismic operations, comprising a multi-conductor cable built with multiple segments, each segment terminated with identical connector plugs. Each segment having a selected number P of take-outs for accepting P seismic signals. The group of P seismic signals from the take-outs are multiplexed in each cable segment, and travel over a single conductor pair in the successive segments to the recording truck, where they are demultiplexed, and as reconstituted signals, are processed and recorded.

13 Claims, 8 Drawing Figures

SEISMIC SYSTEM WITH SIGNAL MULTIPLEXERS

BACKGROUND OF THE INVENTION

1. Field of the Invention

This invention lies in the field of seismic field operations. More particularly, it concerns an improved cable construction in which the cables are made in multiple separate units, each provided with a connector plug by means of which they can be connected in series. Each of these separate cable elements or segments has a plurality of take-outs. The electrical signals from these multiple take-outs are multiplexed in the connector plugs so that a number P of separate geophone groups, connected one to each of the take-outs can be multiplexed and transmitted to the recording truck on a single conductor pair. By this means, the total number of connector pairs in the cable can be reduced by a factor of approximately $P-1$.

2. Description of the Prior Art

In the prior art there are two basic systems of handling the geophone signals between the geophones and the central recording unit or recording truck. The most common method is to provide a multiconductor cable which may be in one long unit, or it can be made from a plurality of cable segments, each of which are connected together in series to provide the desired length of cable. In the conventional system, if there are a total of T geophone groups to be connected to the recording truck, it will require, as a minimum, T conductor pairs in each of the segments of the cable. In view of the high multiplicity of recording channels being utilized in seismic field operations, this requires a very heavy and costly cable to connect each of the geophone groups independently to the recording truck.

In the second type of data acquisitions system a group of array terminals are provided into each of which a group of geophone leads can be attached. These may be from one to any desired number, such as 16, for example. In the array terminal the individual geophone signals are digitized and sequentially transmitted from the array terminal, over a two conductor high frequency digital transmission channel, to the next array terminal, and through that array terminal, to the next one, and the next one, and so on, until it reaches the recording truck. While this can handle immense numbers of recording channels, it is a very expensive and, to say the least, not trouble-free system of data acquisition. The subject of this invention lies in the area between the group 1 system and the group 2 system just described.

SUMMARY OF THE INVENTION

It is a primary object of this invention to provide a cable system for seismic data acquisition, which, by multiplexing the geophone signals in each of the cable segments and transmitting these signals on a conductor pair, a cable system having many fewer conductor pairs than would be required under the case 1 system, can be provided at reduced cost and improved operation.

This and other objects are realized and the limitations of the prior art are overcome in this invention by utilizing a cable which is made up of multiple segments. Each of the segments has a plurality of P take-outs, to each of which a geophone group is connected. In each end of the cable segment, preferably within the connector plug, is housed a multiplexer by means of which a group of P geophone signals, one from each of the take-outs, are multiplexed and transmitted onto the recording truck over a single conductor pair. Each of the P geophone groups is transmitted from a take-out over a separate conductor pair to the multiplexer.

The number of individual geophone signals that can be multiplexed varies from any desired small number to a desired higher number. As an example, a group of six such signals can effectively be collected by the take-outs in a given cable segment. Each of the take-outs is connected to one of six conductor pairs. These six conductor pairs are terminated at each end short of the connector plug, and are then connected individually to one of the six input terminal pairs on a multiplexer (MUX). The multiplexer could, for example, be designed for converting six signals to one signal, or as a 6/1 multiplexer. The output of the multiplexer goes to two conductors which are tied to a corresponding terminal pair in the connector plug.

In addition to the six conductor pairs which are provided to connect from the take-outs to the multiplexer, there will be any selected number $N-1$ of other conductor pairs that pass through the cable from one connector plug to the other. With $N-1$ conductor pairs pass straight through and six conductor pairs carrying signals from the take-outs of that segment of which one goes on to the recording truck $N-1+6=N+5$ conductor pairs are needed in the cable. And $N\times6$ geophone signals can be collected and transmitted over the $N+5$ conductor pairs to the recording truck. Thus, the number of conductor pairs needed is substantially equal to the total number of geophone groups or channels divided by $P-1=6-1=5$. Thus, the size, weight and cost of the cable is considerably less, and the cost of handling the cable, of course, is also much less, than for the heavy cables used in the first type in conventional use.

While I have described the system as having a six to one multiplexer with each section of cable having six take-outs, this is solely by way of example, for clarity of description, and is not by way of limitation since any desired number P, other than six can, of course, be used.

What has been described is a simple system in which the cable segments are all identical, but they have only one multiplexer in each segment. Thus, the segments must be connected to the recording truck in a certain direction, that is, in the direction from the take-outs to the multiplexer to the truck. In common use today are cable systems in which the cable segments have identical plugs on each end, and can be placed in any position in the cable, and can be turned end for end without changing the operation of the cable system.

By utilizing two multiplexers, one at each end of each cable segment, the cable then becomes universal in application. That is, it is identical to every other cable segment, it can be connected at any position in the cable system, and it can be turned end for end without affecting the operation of the system.

There is no limitation on the type and style of multiplexer. Since multiplexers are well known in the art, and are currently available on the market, a workable system can be designed with any one of a variety of different types of multiplexers.

BRIEF DESCRIPTION OF THE DRAWINGS

These and other objects and advantages of this invention and a better understanding of the principles and details of the invention will be evident from the following description taken in conjunction with the appended drawings in which:

FIG. 6 illustrates in schematic fashion one possible type of multiplex system that could be used in this invention. FIG. 6 illustrates the recording and transmitting multiplexer.

DETAILED DESCRIPTION OF THE PREFERRED EMBODIMENT

Figure 1:
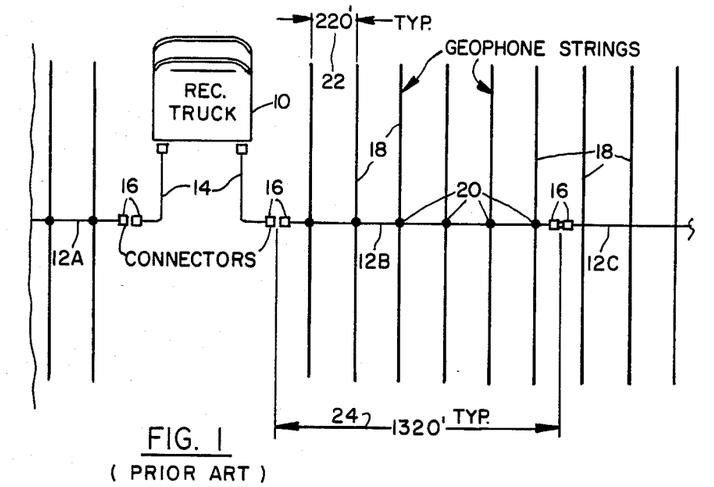
FIG. 1 represents a prior art layout of a recording cable system having multiple segments, each identical, and each terminated with identical connectors so that any segment can be placed in any position in the cable system.

Referring now to the drawings and in particular to FIG. 1, there is shown a prior art arrangement of cable for the acquisition of seismic data in the field. This comprises a long cable made up of individual cable segments 12A, 12B, etc. Each of these cable segments has a connector plug 16 on each end, and has a number of take-outs 20, which are generally equally spaced along the cable segments. The cable segments shown have six take-outs, but the number of take-outs per cable is different for each cable and any number of take-outs from one, to any selected number such as six to ten, for example, are possible. A typical dimension of the space between the take-outs is of the order of 200' to 220', and the length of a typical cable segment is of the order of 1200 to 1400'.

However, there are wide variations in dimensions, and also in the total number of series segments that are utilized. The number of segments is generally a function of the total number of conductor pairs and thus to the weight of the cable. The recording truck 10 carries the acquisition instrumentation and is generally connected to the cabling by means of jumpers 14. The recording truck can be positioned either at one end of the cable array or it can be positioned at an intermediate point, as shown, between segments of the cabling system. At each take-out 20 are generally connected what are called geophone strings, this may provide a number of geophones or other earth sensors, such as possibly six, more or less.

In one of the general types of cabling systems in active use today in seismic data acquisition, each geophone group, such as a geophone string, requires two conductors, or a conductor pair, in the cabling from the position of the geophone take-out, to the recording truck. With the great increase in number of separate recording channels from 48 to 96 to possibly 200 or more, there is a requirement for a great number of individual conductor pairs in the cable, which make the cable extremely heavy and expensive. In order to avoid this excessive weight, the cable segments are made shorter so that they can be carried by personnel, or easily unloaded from a vehicle, and so on. There is a demand for lighter and less expensive cables, for ease of handling and for general economic reasons, and this invention is devoted to the handling of a great number of individual recording and acquisition channels, with many fewer individual conductor pairs than is normally required.

Figure 2:
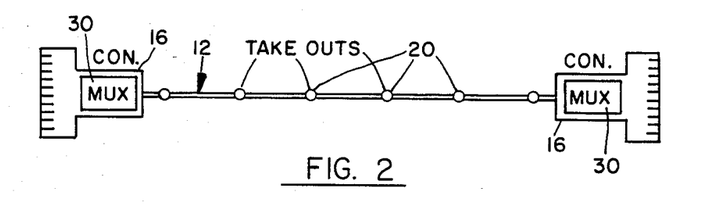
FIG. 2 illustrates schematically a cable segment using this invention in which identical plugs are used on each end of the cable segment and each plug contains a multiplexer.
Figure 3:
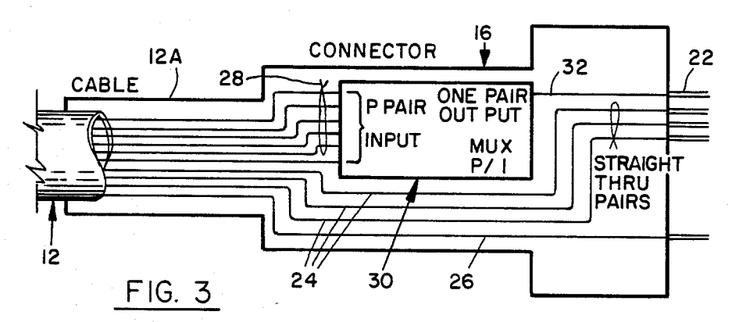
FIG. 3 is an enlarged view of the connector of FIG. 2, showing the cabling system inside the connector plug.

Referring to FIGS. 2 and 3, there is shown to a greater scale an individual cable segment, and to a still larger scale, one end of the cable segment and the connector. The cable segments have connectors 16 on each end, which in present day systems may have up to one hundred to two hundred or more pairs of connector pins, which connect the separate cable segments in series, with each geophone group having a dedicated conductor pair from its position, to the recording truck, through a great many connectors. This is accomplished by proper numbering of the connector pins in each of the connectors or plugs. The numbering system forms no part of this invention. In FIG. 2 is shown schematically how a multiplexer 30 can be inserted into the cable, or into each of the connector plugs 16 on each end of the cable segment 12.

FIG. 3 shows to greater clarity, how the multiplexer 30 (MUX) is connected into the cabling. Assume, for example, that there are six take-outs as shown in FIG. 2 and each of these take-outs is connected to a different one of P conductor pair 28 in the cable. For example, with P equal to six take-outs, there would be six conductor pairs 28 connected to the input of a multiplexer 30. This would be a six to one multiplexer, indicating that six independent signals are multiplexed on a single output conductor pair 32. There would be a multiplexer in the connector plug at each end of the cable segment 12A. Thus, no matter in which direction the recording truck was positioned with respect to this segment, the six separate geophone signals on the six conductor pairs 28 would be multiplexed and sent to the recording truck. As shown in FIG. 3 the six conductor pairs would be cut short of the connector pins, and would join to a corresponding six pairs of input pins on the multiplexer 30. On the output of the multiplexer the single conductor pair 32 now carries the six separate geophone signals to the connector pins 22 of the connector plug 16. These pins 22 are numbered and dedicated through the whole series of segments to the recording truck.

In the cable segment of FIG. 3 there is another group of conductor pairs 24, which pass directly from a connector plug at one end to the connector plug at the other end. These are called "straight through" pairs, and will be used in another cable segment to connect another group of six geophone signals to the recording truck and so on.

In the use of the cable of FIGS. 2 and 3, with the large number of individual geophone signals, each individual conductor pair is dedicated to a group of six signals. The numbering system on the pins in each of the connectors is such as to find the proper dedicated conductor pair in each cable to which the multiplexer output 32 is continuously connected to the recording truck. The numbering system on the plugs in use today with a large number of individual conductor pairs has been devised, and is in common use to maintain this dedication, in spite of the fact that any of the cable segments can be connected in any position along the cable, and any one of the two ends can be connected to one end or the other of the adjacent cable segments.

This convenience of having all the cable segments identically the same is a great advantage in the field handling of the cables. The numbering system of the conductor pins in the plugs forms no part of this invention, and will not be described further.

Assume, for example, that without the use of auxiliary or control conductors, or spares, that there are 12 cable segments gathering 12×6 or 72 individual geophone signals. Thus, the group 24 (shown as 3 straight through pairs) would be 11 straight through pairs. These with the single pair from the multiplexer would make a total N of 12 straight through pairs. Shown also is a single conductor pair 26, which can be used as spare or for control, or for any other reason. Generally there will be more than one spare conductor 26 in the cable so that in the event of a conductor failure in a cable segment one of the spares can be connected into its position, etc.

Assuming that there are 12 conductor pairs for 72 channels of geophone signals, there will be 11 straight through pairs 24 in any cable segment, such as 12A and there will be in addition, 6 conductor pairs. Assuming that there are 12 conductor pairs carrying six signals each, there will be in any cable segment 11 straight through pairs and one pair such as 32 making the 12th one, which passes the signals from the six separate conductor pairs 28 which are connected individually to the take-outs. Thus the total number of conductor pairs used for signals would be 12−1+6, or 17 conductor pairs for carrying 72 individual geophone signals.

This can be explained a little more simply by denoting P as the number of take-outs 20, and the number of conductor pairs 28, which serve those take-outs. In addition, there are N−1 straight through pairs providing a total of N pairs carrying individually 6 separate signals. It is thus seen that by the use of these multiplexers in the cable segments that a great number of individual recording channels can be provided with much fewer individual conductor pairs. In the example just described 72 individual signals would be transmitted with a cable carrying fewer than ¼ of that number of individual conductor pairs. So there is a reduction in weight and cost of the cable by a factor of about four.

While I have shown in FIG. 2 a specific example of a conductor segment having six take-outs and a corresponding multiplexer having a reduction of six to one signals between the input and the output, the number of individual take-outs and the corresponding design of the multiplexer is variable, at the choice of the designer.

However, the cable segment in FIG. 2 is shown as one in which the interior cabling system and the construction having two identical plugs and two identical multiplexers make the segment 12 a universal cable segment which can be positioned at any point along the line of cabling and can be connected end for end in that line.

Figure 4:
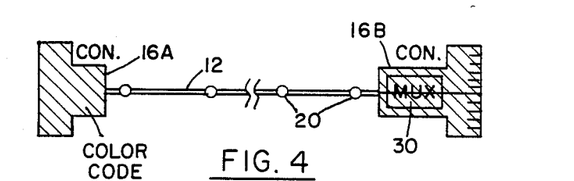
FIGS. 4 and 5 show variations of the system of FIG. 2.

In FIG. 4 is shown a variation of FIG. 2 in which the two connector plugs 16A and 16B are different, in that one, 16A, is just a simple connector, and the other, 16B, is a connector plus a multiplexer. This design would operate identically to FIG. 2 provided the cable segment was inserted into the cabling in the proper end for end position, so that the end having the multiplexer always pointed down line to the recording truck. For this reason the two connectors on each end would be different. And while segment would be compatible with other connectors in the line of cable segments, the segment would not provide a universal cable as shown in FIG. 2.

Thus, one end of the cable segment must be identified as being different from the other end of the cable segment, such as by color coding, for example. In this way, a considerable reduction can be made in the cost of each cable segment, at the expense of some flexibility in its use and handling.

Figure 5:
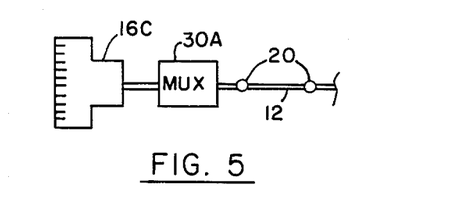

In FIG. 5, I have shown an arrangement of a connector 16C, similar to connector 16B in FIG. 4. However the multiplexer 30A is not in the connector plug, but is in a separate container 30A in series with the connector plug. This is to point out, of course, that the multiplexer can be positioned either inside the connector, or in a separate box connected into the cabling, between the connector and the first take-out.

This description encompasses the new feature of multiplexing built into each of the cable segments and can, of course, be used with any type of multiplexer that would be desired. Multiplexers of many different styles have been designed and built, and are in use in many electronic systems and particularly, for example, in the telephone industry where great number of individual signals are multiplexed on a single communication channel.

Figure 6:
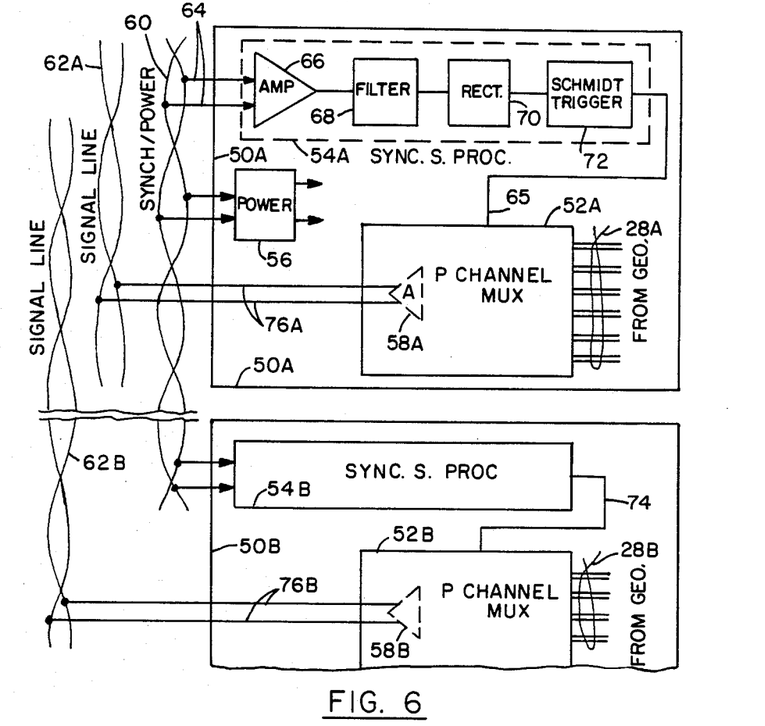
Figure 7:
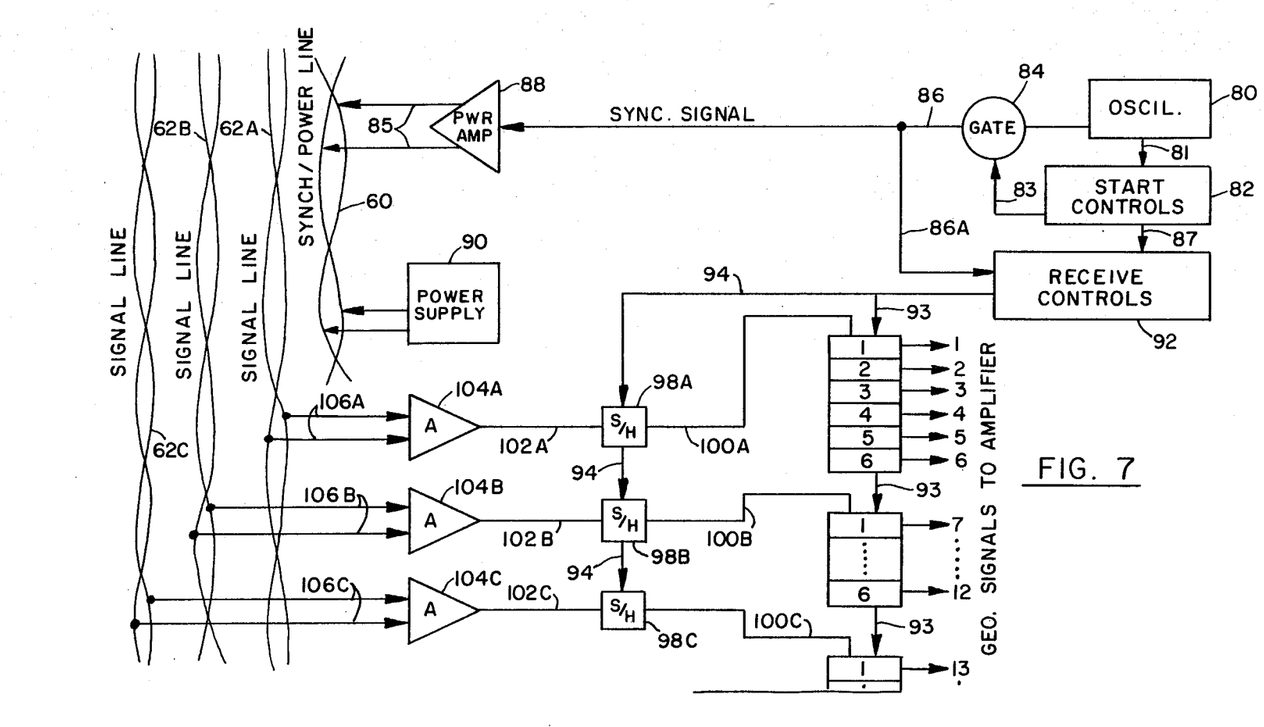
FIG. 7 illustrates the recording truck end of the cable with the demultiplexers.
Figure 8:
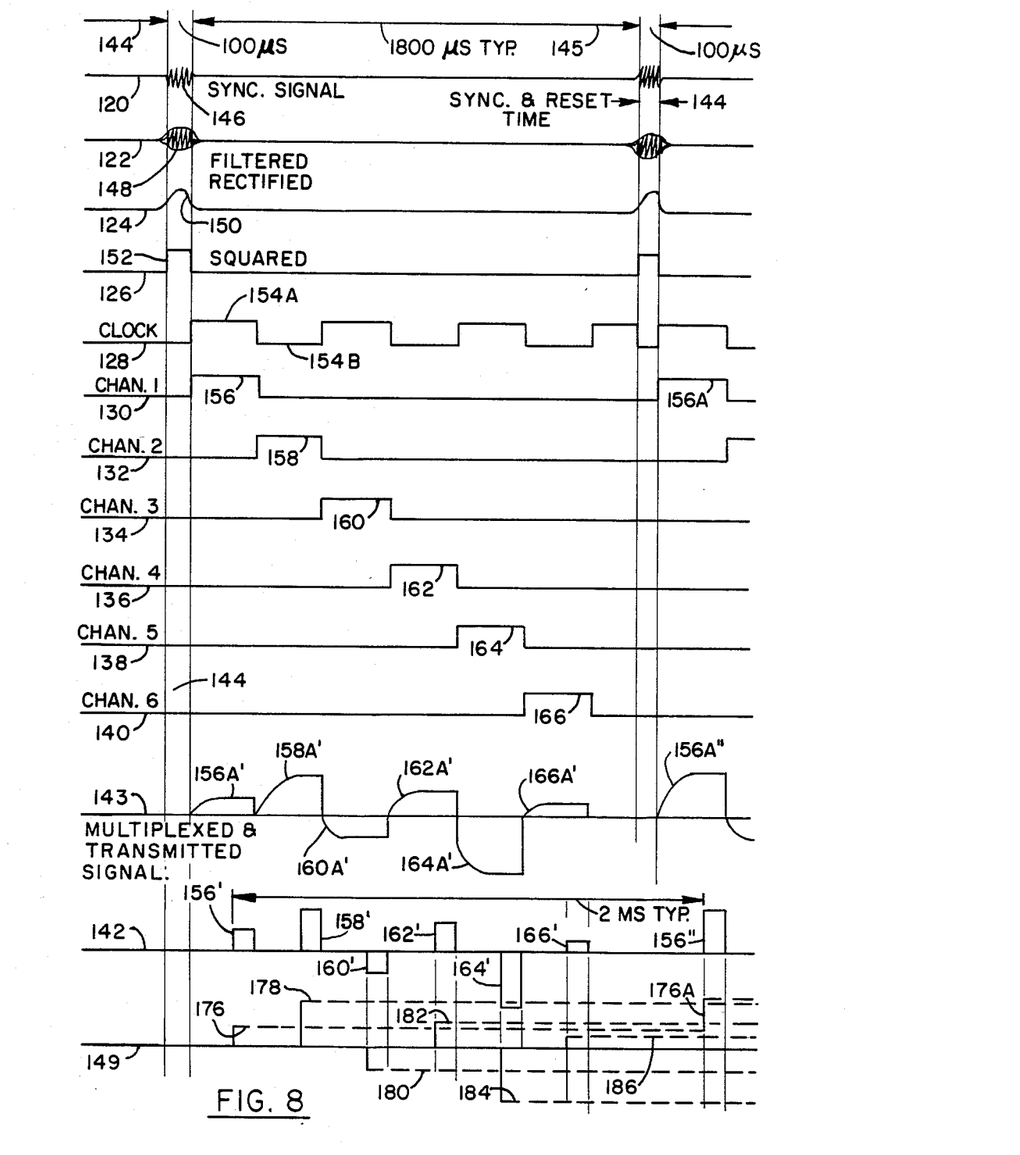
FIG. 8 illustrates a few of the wave forms in the various parts of the system of FIGS. 6 and 7.

In FIGS. 6, 7 and 8 I show a typical multiplexing system that can be used with the cabling of FIGS. 1, 2 and 3. In FIG. 6 I have shown two conductor pairs or signal lines 62A and 62B which would be in the cabling, and a power and sync signal conductor pair 60. This could be one of the extras, such as pair 26 of FIG. 3.

A synchronizing signal is sent along the conductor pair from the recording truck to each of the cable segments, and to each of the multiplexers. This will be described in greater detail in connection with FIG. 8. However, the box labeled 50A represents the apparatus that would be supplied in the box 30 of FIGS. 2 and 3. The P channel multiplexer and amplifier 52A takes the individual geophone signals coming in on say six conductor pairs 28A. These are multiplexed and passed through amplifier 58A and conductor pair 76A, to one of the straight through conductor pairs 62A.

In each of the multiplexers, of course, there must be a clock or timing mechanism by which the operation of the multiplexer can be synchronized with the demultiplexer at the recording truck. With this sync signal each of the individual, say six, geophone signals can be recognized on the basis of a time schedule and they all can be joined together in a proper way by a single output signal for each channel in the recording truck.

The clock that controls each of the multiplexers in the cable is a signal on the line 60 in the cable. This is a very high frequency signal which is pulsed on the line 60 at the recording truck, and is recognized at each of the multiplexers. This series of high frequency pulses goes by leads 64 to an amplifier 66, in the sync signal processor 54A. A filter filters out the high frequency and leaves an envelope, which forms a lower frequency pulse that goes to a rectifier 70, to form a single unidirectional pulse. This process will be explained further in connection with FIG. 8. This pulse is now passed to a Schmidt trigger, which is a conventional piece of circuitry, readily available, which takes this uni-directional pulse from the rectifier 70 and squares it up into a useful control pulse, and passes it over lead 65 to the multiplexer 52A. The power supply 56 utilized in the box 50A is taken from the line 60 and is conventional in all respects and needs no further discussion.

Within the box 52A is a multiplexer, the timing of which is controlled by the pulses on line 65. The multiplexer, or any multiplexer, has a very rapid switch, which continually sequentially connects an output line to one of the P input lines, for a very short period related to the successive pulses on the line 65. In other words it successively samples the signal on each of the input lines, in a specific order, and transmits sequentially on a single conductor pair 76A, to the signal line 62A, the series of samples which have been taken by the multiplexer.

At the recording truck the same clock will permit another switch in the demultiplexer to separate each of the serial samples on the conductor pair 62A, and output them on six output lines labeled 1, 2, 3, 4, 5, 6, etc. of the demultiplexer.

The action of the demultiplexer is directly opposite to the action of the multiplexer, and since they are both synchronized by the same time pulses, the original six analog signals on the input of the transmitting multiplexer, are reproduced on the output lines from the demultiplexer.

It is thus seen that the apparatus in the box 50A, Which is called MUX in FIG. 3, comprises a sync signal processor 54A, providing the timing signal to the multiplexer 52A, the output signal of which goes to amplifier 58A and through 76A to the signal line 62A. Another signal from a group of geophone signals 28B in the multiplexer 50B would provide an output signal through line 76B to a second signal channel 62B and so on.

All of the elements in the box 50A, such as the amplifier, filter, rectifier, Schmidt trigger and multiplexer are all on the shelf items, and need no further detailed description.

Referring now to FIGS. 7 and 8, there are shown a plurality of demultiplexers that are served by signal lines 100A, 100B, and 100C etc. handling signals from three signal lines 62A, 62B and 62C. The sync and power line 60 is the same as that shown in FIG. 6. The apparatus in FIG. 7 is that which would be incorporated in the recording truck and serves two principle purposes. It provides the synchronizing signal that goes onto the line 60, and provides the synchronizing signal for the sync processors 54 and multiplexers 52 for the individual conductor pairs.

The sync signal starts with a high frequency oscillator 80, of a frequency that is much higher than the geophone signals themselves and is also higher in frequency by a selected factor than is the frequency at which the digitizer operates, to sample successive signals. This may be up in the range of 50 to 100 KHZ. A box labeled start control takes this oscillator signal as a clock over lead 81 and by means of counters etc. provides periodic opening of a gate 84 through lead 83. This permits the oscillator 80 signals to go by lead 86 as a sync signal to a power amplifier 88 and through leads 85 to the power line 60.

The interval during which the gate 84 is open is a time interval, shown in FIG. 8 as 144, which may be typically 100 micro seconds, for example. On line 120 of FIG. 8 is shown such a pulse 146 of high frequency which is the sync signal. This travels down power lines 60 to each of the cable segments and to the multiplexers in each segxent. On line 120 (FIG. 8) the sync signal 146 is that which would pass over lines 64 of FIG. 6 to the amplifier 66 and to the filter 68. Beyond the filter 68 the signal would look like the signals 148 on line 122 of FIG. 8. The rectifier then converts pulse 148 to the pulse 150 on line 124, which is a uni-directional pulse rather than an oscillatory pulse. The Schmidt trigger forms the pulse 150 into an improved squared pulse 152 shown on line 126.

Referring back to FIG. 7, the oscillator signal serves as a clock through 81 to the start control 82. The same clock signal goes by 87 to the receive control in box 92. The receive controls box 92 takes the sync signal on line 86A and processes it as is done in the sync processors such as 54A. The output of the receive controls then outputs appropriate pulses similar to that 152 of FIG. 8, which goes to a sample and hold 98A, 98B, 98C, etc. and also to the demultiplexers 1, 2, 3, 4, 5, 6 etc. over line 93.

At the recording truck, the signal lines 62A, 62B, 62C, etc. have processors connected to each of them over the lines 106A, 106B, 106C and so on. These signals are amplified by amplifiers 104A, 104B, 104C, etc. The power supply 90 is conventional, and outputs selected power signals DC and/or AC as desired.

Referring back to FIGS. 6 and 8, there is in the MUX channel 52A, for example, a counter which counts down the timing clock initiated by the dropping edge of the squared pulse 152, which comes from the Schmidt trigger. This creates a series of pulses 154A, 154B on line 128, which are used to time successive channels, such as channel 156 shown on line 130. This opens, or samples, channel 1 on the input 28B to the MUX box 50A, for example. The second pulse 154B controls the sampling period 158 of channel 2 shown on line 132 and similarly, the sampling periods 160, 162, 164 and 166 shown on lines 134, 136, 138 and 140 for chanhels 3, 4, 5 and 6 respectively. The time for the sampling period 156, for example, is quite short and during that interval the geophone signal amplitude is assumed to be substantially constant.

The pulses 156A′, 158A′, 160A′, 162A′, 164A′ and 166A′, for example, although square when they leave the MUX, represent the instantaneous samples of each of the six signals which reach the recording truck amplifiers 104 after travelling down the signal lines in the cable. As the square pulses move down the line, they become rounded into more or less of the shape of the pulses 156A′, 158A′, 162A′, 164A′ and 166A′, etc.

Referring back to FIG. 7 again, the amplifiers 104A, 104B and 104C pass signals such as that shown on line 143. These are sampled by the sample and hold 98A, 98B, 98C, etc. The sampling is at a point close to the end of the pulse, where the amplitude is more truly representative of the amplitude of the signal which was inserted on the lines at the geophone position. The sampled pulses from the sample and hold would look like the pulses 156′, 158′, etc. on line 147. These go by lines 100A, 100B and 100C, for example, to the demultiplexers 1, 2, 3, 4, 5, 6, etc. which, having the sync pulses over line 93 break out the individual segments of the signals on lines 100. These are then sorted out by the demultiplexer and impressed on the lines 1, 2, 3, 4, 5 and 6, etc. These pulses 156′, 158′, etc. are stretched to a time length 145, and would look like the broadened pulses 176, 178 and 180, etc. of line 149.

After a second interval 145, another sync signal is transmitted, and the same process of sampling as has just been described, is repeated a second time and so on.

The sampling periods would be a length of time equal to the sum of the sample times and the sync signal pulse 144. This would be the time for the multiple sampling operations 145 plus 144. This total period would be a function of the rate of sampling and must be frequent enough, so as to make it possible to recover the true amplitudes, of the analog signals from each of the geophones, and so on. Time intervals which might be typical are shown as 100 micro seconds for the sync signal and possibly 1800 micro seconds or less, for the interval during which the sampling is cycled. However, these times are not to be limiting in any way and are shown only as possible values.

In the recording truck the amplitude samples 156A', 158B', 160C', etc. are sampled in the sample/hold boxes 98A, 98B, 98C, etc. to provide square pulse 156', 158', 160', etc. as shown on line 147. The amplitudes of these pulses represent the transmitted amplitudes of the geophone signals. They go by lines 100A, 100B, 100C, etc. to the demultiplexers 1, 2, 3, 4, 5 and 6 etc. respectively. In the demultiplexers the narrow pulses 156', 158' and 160' are broadened and held for a full multiplexing period, or time between sync signals. These are shown in line 149, where the dashed lines 176, 178, 180, etc. represent the broadened pulses, which are updated at the times of each sync signal.

As has been pointed out, FIGS. 6, 7 and 8 represent one of many types of multiplexing systems, any one of which could be used with the cabling system of this invention.

What has been described is an improved seismic cabling system, and method of operation, for transmitting multiple independent geophone signals over selected conductor pairs in a cabling system to processing and acquisition apparatus in a recording truck. This is done by providing a multiplexer in at least one end of each of the cable segments which processes the individual analog geophone signals in response to a synchronizing signal transmitted to each of the multiplexers. The multiplexers sample successively the separate geophone signals in accordance with the synchronizing signal and these samples are sequentially transmitted along dedicated conductor pairs from the multiplexers to the recording truck.

At the recording truck the separate sequential samples of the group of geophones dedicated to one of the conductor pairs in the cable system is then demultiplexed and separated into separate signal samples on each output line. The sequential signal samples provide an analog signal substantially identical to that which was delivered from the geophone. The reconstituted signals are then recorded in the normal manner in the recording truck.

While I show a conductor pair in the cabling system which is used for power transmission, it would be equally possible, of course, to provide individual batteries in each of the cable segments to power the apparatus shown in FIG. 6 corresponding to each of the multiplexers.

Also while I show a synchronizing signal that is transmitted on a special conductor pair, it is possible, of course, to apply these very high frequency pulses to the signal conductor pairs, and to filter out the high frequency, to provide the needed sync pulses plus the normal analog geophone signals for processing.

Also, while I show a type of multiplexer which is a so called "time division multiplexer", there is also a second type of multiplexer which is a "frequency division multiplexer", which could, of course, be used in place of the one described.

Although it is preferable to use two multiplexers in each of the cable segments, the system will work with only one multiplexer in one end of each cable segment, provided the multiplexer end is pointing downline to the recording truck.

It will be clear, of course, that with a multiplexer in each end of a cable segment, the two multiplexers operate in a slightly different manner. That is, the sequence in which each of the P take-outs are sampled are sequentially in the direction toward the multiplexers, and toward the recording truck. Thus, with two multiplexers, the sequence in which the take-outs are sampled would be opposite in the two multiplexers.

As shown in line 120 of FIG. 8, the high frequency sync signal will have considerable electrical noise, and the filter 68 of FIG. 6 helps to clear up the sync signal. Thus when the signal is rectified to form the pulse 150, it will be a clean pulse.

It will be clear that when the circuits of FIG. 6 are considered as part of the cable system the demultiplexed signals, such as 176, 178, etc., will provide signals substantially identical to the original geophone signals. Thus, this cable system will work with the standard field amplifiers which are used with conventional cable systems of the first class.

While the invention has been described with a certain degree of particularity it is manifest that many changes may be made in the details of construction and the arrangement of components without departing from the spirit and scope of this invention. It is understood that the invention is not to be limited to the exemplified embodiments set forth herein but is to be limited only by the scope of the attached claim or claims, including the full range of equivalency to which each element thereof is entitled.

What is claimed is:

1. In a seismic recording system in which a seismic cable, having a plurality of conductor pairs, constructed in the form of a plurality of separate cable segments connected in series, and in which both ends of each cable section are connected to identical connector plugs, and in which a selected plurality of take-outs are molded into each of said cable segments at selected spaced intervals between its ends, the improved cable system, comprising;

(a) a first selected number P of conductor pairs in each cable segment dedicated to a selected number P of take-outs in said cable segments; a second selected number N−1 of conductor pairs in said cable segment connected to a corresponding N−1 connector pin pairs in said connector plugs, where N is at least equal to the number of cable segments connected in series, and in use;

(b) said P conductor pairs is each cable segment connected, at least at one end, to a corresponding P pin pairs on the input of a P/1 signal multiplexer (MUX) said multiplexer having P input connector pairs and one output connector pair, which is connected by a conductor pair, to a corresponding single pair of connector pins in at least one of the connector plugs; said single pair, and said N−1 pairs of connector pins forming a total of at least N pairs of connector pins in each plug;

(c) each pair of said N pairs of conductor pairs and connector pins in each connector plug, dedicated throughout the length of the assembled cable segments to the multiplexed groups of P seismic sensor signals of each of said N cable segments in said assembled cable.

2. A cable system for carrying out seismic operations, comprising:
(a) at least a first segment of a plurality of segments of a multi-conductor cable, terminated by a first connector plug means at a first end and a second connector plug means at a second end of said segment;
(b) at least two of a selected total number of N conductor pairs in each segment of said cable; of which a selected number P conductor pairs are each connected to one of P spaced takeout means along said segment;
(c) the remaining N−1 conductor pairs in said cable segment, each connected respectively to one pair of connector pairs in each terminating connector plug at each end of said said N−1 conductor pairs;
(d) At least a first multi-signal multiplex means (MUX) having P pairs of input terminals, to which one end of each of said P conductor pairs are connected; one conductor pair to each input pair, of a first MUX at a first connector plug means at one end of each of said P conductor pairs; the single conductor pair output of said first MUX connected to one pair of connector pins in said first terminating connector plug at a first end of said cable segment making a total of N multiplex means each transmitting a multiplexed signal over one of said N conductor pairs.

3. The cable system as in claim 2 including at least a second multiplexer in said cable segment at said second end.

4. The cable system as in claim 2 in which said at least one multiplexer is built into said connector plug.

5. The cable system as in claim 2 in which said at least one multiplexer is housed in a separate container inserted into said cable segment between said connector plug and said first take-out.

6. The cable system as in claim 2 and including a plurality of N demultiplexer means at the first end of said cable at the recording truck each demultiplexer means connected to one of said multiplex means through one of said N conductor pairs.

7. The cable system as in claim 6 and including sync signal means at said first end of said cable for synchronization of all said multiplexer and demultiplexer means.

8. The cable system as in claim 2 in which said multiplexer means comprises time division multiplexer means.

9. The cable system as in claim 2 in which said multiplexers means comprises frequency division multiplexer means.

10. The cable system as in claim 8 in which said multiplexing means includes a sync signal processor means for processing the sync signal into a rectangular timing pulse to time the multiplexers.

11. The cable system as in claim 8 in which in a cable segment, said P take-out signals are sequentially sampled in a direction from the farthest from the recording truck, toward the nearest to the recording truck.

12. The cable system as in claim 8 in which said multiplexers are analog signal multiplexers.

13. In a seismic data acquisition system having a multi-conductor cable having at least N cable segments, where N is greater than 1, and P takeouts in each segment, for a total of at least NP different seismic signals and including in each cable segment at least one multiplexer for sequentially multiplexing said P takeout signals and transmitting them over a single independent conductor pair to a recording truck, the method of operation, comprising the steps of:
(a) providing a synchronizing signal from the recording truck to each of said N multiplexers; one in each segment;
(b) at a first of said N multiplexers in a first cable segment sequentially sampling each of the P takeout signals in said first segment and transmitting them along a single conductor pair in said cable to said recording truck; and
(c) at the recording truck demultiplexing said multiplexed signals from said first segment; while simultaneously
(d) sequentially sampling each of the other P takeouts in each of the other N−1 segments through each of the other N−1 conductor pairs; and simultaneously
(e) at the recording truck demultiplexing each of said N multiplexed signals.

* * * * *